(12) United States Patent
Azogui et al.

(10) Patent No.: US 9,916,199 B2
(45) Date of Patent: Mar. 13, 2018

(54) METHOD AND APPARATUS FOR AN ERROR TOLERANCE AWARE DATA RETENTION SCHEME IN A STORAGE DEVICE FOR MULTI-SCALE ERROR TOLERANT DATA

(71) Applicant: INTEL CORPORATION, Santa Clara, CA (US)

(72) Inventors: Tal Azogui, Petach Tikva (IL); Vered Bar Bracha, Hod Hasharon (IL); Vallabhajosyula S. Somayazulu, Portland, OR (US); Wei Wu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/086,050

(22) Filed: Mar. 30, 2016

(65) Prior Publication Data
US 2017/0286221 A1 Oct. 5, 2017

(51) Int. Cl.
G11C 29/00 (2006.01)
G06F 11/10 (2006.01)
G06F 3/06 (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
CPC .... G06F 11/1076; G06F 3/0619; G06F 3/064; G06F 3/067
See application file for complete search history.

(56) References Cited

U.S. PATENT DOCUMENTS

2011/0231596 A1* 9/2011 Goss ................... G06F 12/0246
                                                            711/103
2012/0324191 A1   12/2012 Strange et al.
(Continued)

FOREIGN PATENT DOCUMENTS

EP          1058264         12/2000

OTHER PUBLICATIONS

Cai, Y., et al., "Error Patterns in MLC NAND Flash Memory: Measurement, Characterization, and Analysis", Proceedings of the Conference on Design, Automation and Test in Europe, 2012, 6 pp.
(Continued)

*Primary Examiner* — Sam Rizk
(74) *Attorney, Agent, or Firm* — Konrad Raynes Davda & Victor LLP; David W. Victor

(57) ABSTRACT

Provided are a method and apparatus for an error tolerance aware data retention scheme in a storage device for multi-scale error tolerant data. A mapping of retention priorities to sectors of the storage units maps higher retention priorities to sectors having a higher retention capability. A data stream and retention metadata for the data stream indicate retention priorities for segments of the data stream. Segments of the data stream having less error tolerance are mapped to higher retention priorities than segments of the data stream having greater error tolerance. The mapping of retention priorities is used to determine a sector having a retention priority matching a retention priority of a segment of the data stream indicated in the retention metadata. The segment of the data stream is stored in the determined sector.

21 Claims, 7 Drawing Sheets

(56) References Cited

U.S. PATENT DOCUMENTS

| | | |
|---|---|---|
| 2014/0281819 A1 | 9/2014 | Wood et al. |
| 2015/0161148 A1 | 6/2015 | Randell et al. |
| 2015/0370723 A1 | 12/2015 | Nambiar et al. |
| 2016/0179421 A1* | 6/2016 | Hwang ................ G06F 3/0619 |
| | | 711/162 |

OTHER PUBLICATIONS

Immich, R., et al., "Adaptive Video-Aware FEC-Based Mechanism with Unequal Error Protection Scheme", Proceedings of the 28th Annual ACM Symposium on Applied Computing, Mar. 2013, 8 pp.

Lin, T., et al., "A Versatile Model for Packet Loss Visibility and its Application to Packet Prioritization", IEEE Transactions on Image Processing, vol. 19, Iss. 3, Dec. 2009, 27 pp.

Liu, R., et al., "Optimizing NAND Flash-Based SSDs via Retention Relaxation", Proceedings of the 10th USENIX conference on File and Storage Technologies, 2012, 14 pp.

Mukhtar, H., et al., "An Occupancy-Based and Channel-Aware Multi-Level Adaptive Scheme for Video communications Over Wireless Channels", EURASIP Journal on Wireless Communications and Networking, 2011, 17 pp.

Sivanagaraju, V., et al., "Comprehensive Analysis of BER and SNR in OFDM Systems", International Journal of Innovative Research in Computer and Communication Engineering, vol. 2, Iss. 2, Feb. 2014, 7 pp.

Toni, L., et al., "Channel Coding Optimization Based on Slice Visibility for Transmission of Compressed Video Over OFDM Channels", IEEE Journal on Selected Areas in Communications, vol. 30, No. 7, Aug. 2012, 12 pp.

International Search Report and Written Opinion for International Application No. PCT/US2017/020034, dated May 24, 2017, 11 pp. [77.340PCT (ISR & WO)].

* cited by examiner

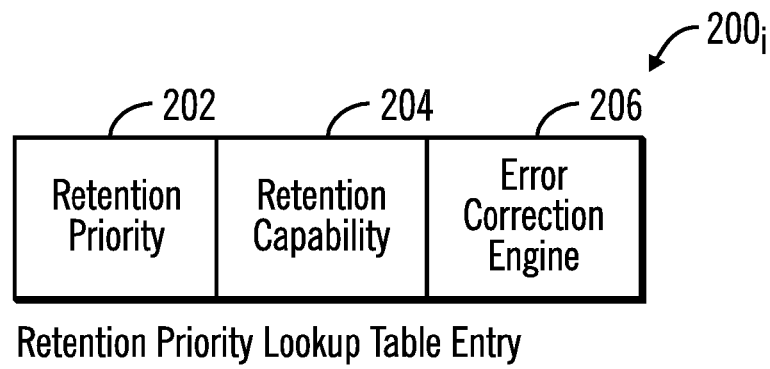
Retention Priority Lookup Table Entry
FIG. 2
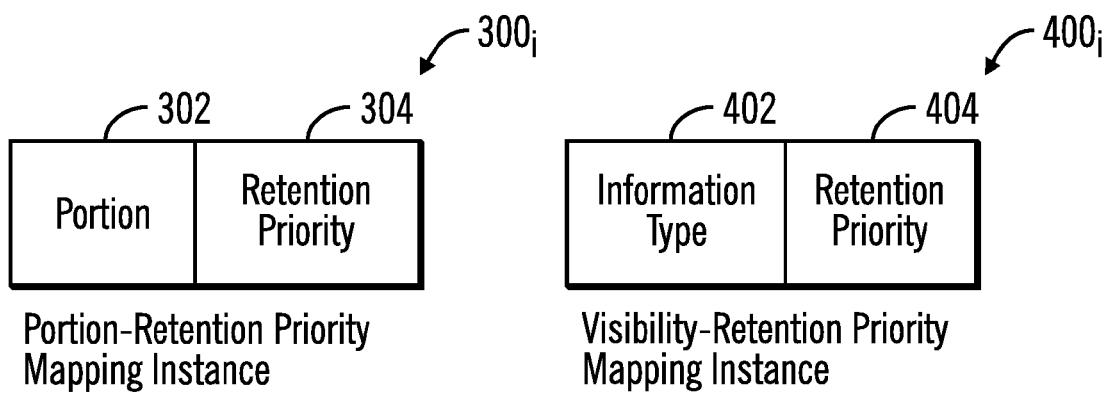
Portion-Retention Priority Mapping Instance
FIG. 3
Visibility-Retention Priority Mapping Instance
FIG. 4
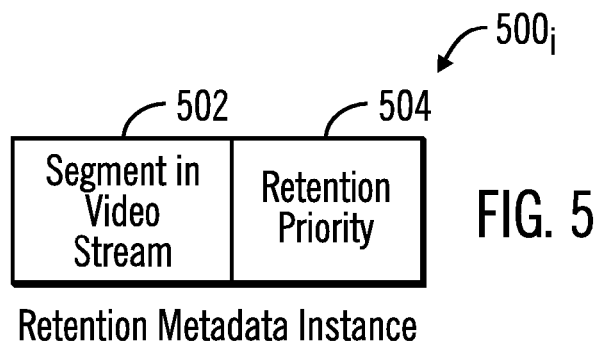
Retention Metadata Instance
FIG. 5

METHOD AND APPARATUS FOR AN ERROR TOLERANCE AWARE DATA RETENTION SCHEME IN A STORAGE DEVICE FOR MULTI-SCALE ERROR TOLERANT DATA

TECHNICAL FIELD

Embodiments described herein generally relate to a method and apparatus for an error tolerance aware data retention scheme in a storage device for multi-scale error tolerant data.

BACKGROUND

Video data streams are often stored on non-volatile memory storage devices, such as a solid state drive (SSD) and flash drives comprised of multiple NAND dies. However, non-volatile memory devices are prone to deteriorating data retention with limited cycles of read/write data and production process-derived leakage errors. The non-volatile storage may provide error correction information that may be used to recover data lost through degradation of the non-volatile memory storage cells.

There is a need in the art for improved techniques for storing multi-scale error tolerant data, including video data, on non-volatile memory storage devices.

BRIEF DESCRIPTION OF THE DRAWINGS

Embodiments are described by way of example, with reference to the accompanying drawings, which are not drawn to scale, in which like reference numerals refer to similar elements.

FIG. 2 illustrates an embodiment of a retention priority lookup table.

FIG. 3 illustrates an embodiment of an instance of a sector-retention priority mapping instance.

FIG. 4 illustrates a visibility-retention priority mapping instance.

FIG. 5 illustrates a retention metadata instance.

DESCRIPTION OF EMBODIMENTS

Figure 1:
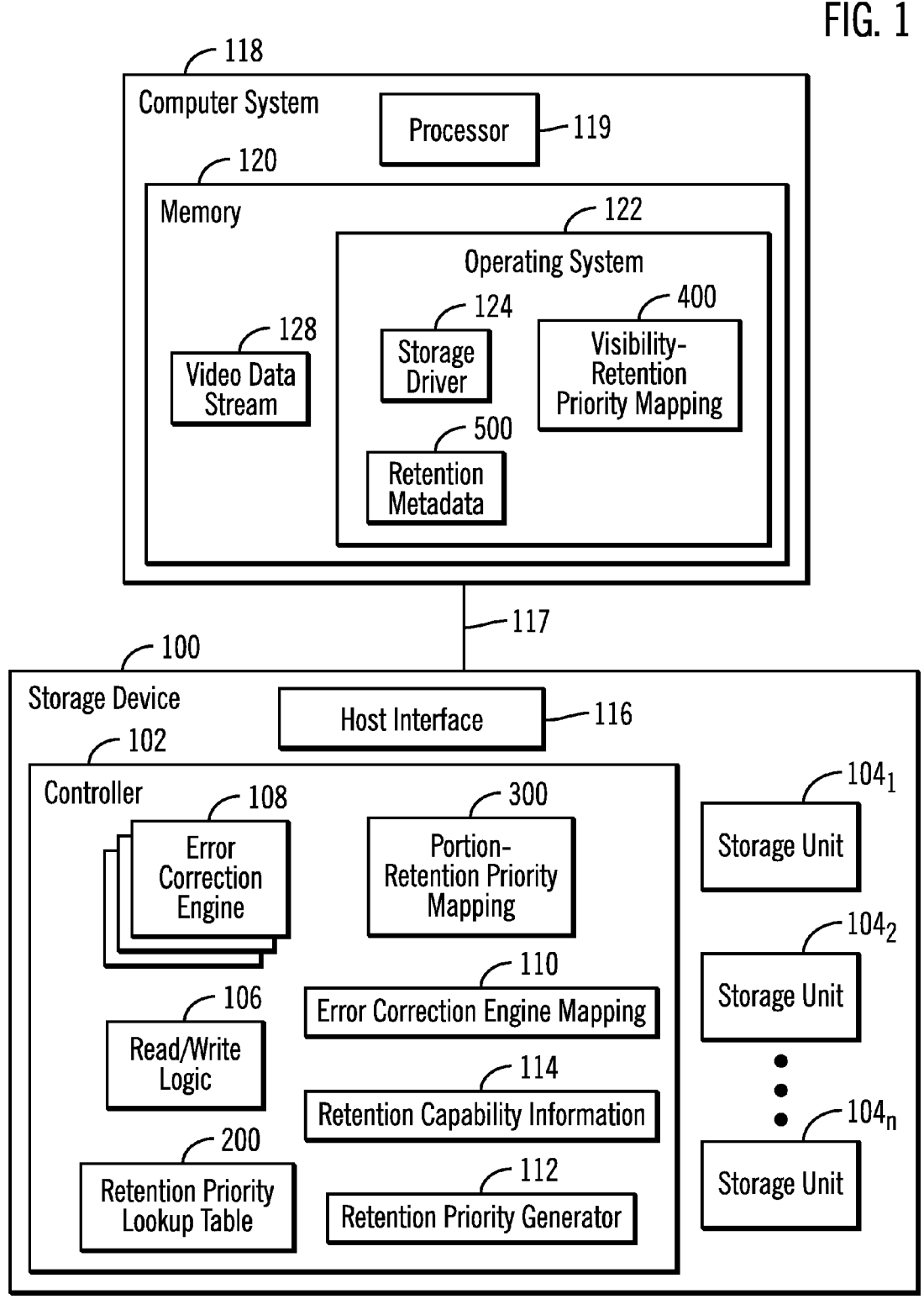
FIG. 1 illustrates an embodiment of a computing environment with a computer system and storage device.

Video quality metrics of stored video are subjective and based on human perception. Certain of the segments or sections of a video data stream may have a limited impact on visibility of the video stream, such that the degradation of such data may not have much predicted effect on visibility. Such segments having limited impact on visibility have a high error tolerance, in that errors with such data have a limited effect on video quality. However, other segments of a video data stream may have a significant effect on video quality and visibility, and their loss or degradation while on storage could contribute significantly to poor visibility and low quality of the video, making such segments low error tolerant.

A loss visibility model may provide a visibility scoring or rating of different information types in a video data stream based on their predicted effect on the visibility. Described embodiments may have a storage driver in a computer system maintain a mapping of information types in a video data stream to retention priorities to use to determine retention priorities for segments in the received video stream based on the information types of the segments and retention priorities assigned to the information types in the mapping of information types. The storage driver generates retention metadata for a video stream indicating the retention priorities for the segments in the data stream and sends the retention metadata and the data stream to the storage device to store the segments in sectors of the storage device associated with retention priorities of the segments indicated in the retention metadata.

The storage device receives the video data stream and retention metadata. The storage device uses a mapping of retention priorities to sectors of storage units in the storage device to determine a sector having a retention priority matching a retention priority of a segment of the data stream indicated in the retention metadata. The segment of the video stream is stored in the sector to which the retention priority of the segment maps.

With the described embodiments, information types of segments of a multi-scale error tolerant data stream (such as a video data stream) are mapped to retention priorities based on their predicted error tolerance, such that data more crucial to the fidelity or importance of the data stream has less error tolerance than data in the data stream having a greater effect on the quality of the data stream. In this way, segments of data having less error tolerance (such as video segments having a greater effect on visibility) are stored in a sector of the storage device associated with a higher retention priority having a greater likelihood to retain such segments. Whereas, segments having greater error tolerance (such as video segments having a minimum effect on visibility) are stored in a sector associated with a low retention priority and having a greater likelihood that data will be degraded or lost when stored in such sectors. In this way, the less error tolerant data (e.g., more important data) is stored in sectors of the storage device less likely to experience degradation and/or more likely to be recovered in the case of an error.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a storage device 100, such as a solid state drive (SSD), including a memory controller 102 to perform read, write and error recovery (also known as read retry) operations with respect to a memory storage array comprising non-volatile storage units $104_1, 104_2 \ldots 104_n$. The controller 102 maintains read/write logic 106 to perform read and write operations with respect to the storage units $104_1, 104_2 \ldots 104_n$, which may comprise electrically erasable and non-volatile memory cells, such as flash storage devices. For instance, storage units $104_1, 104_2 \ldots 104_n$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage units $104_1, 104_2 \ldots 104_n$ may also comprise, but not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices.

The controller 102 includes a sector-retention priority mapping 300 providing a mapping of sectors in the storage units $104_1, 104_2 \ldots 104_n$ to retention priorities, where sectors having a higher retention priority have storage cells having a greater storage retention capabilities than sectors having storage cells with a lower priority and retention capability. In one embodiment, a sector may comprise one or more integrated circuit dies implementing the storage cells. In an alternative embodiment, multiple sectors may be on a die. Alternatively, a sector may comprise other partitions or divisions of the dies or an array or cells for which error correct codes may be calculated.

The controller 102 further includes error correction engines 108 and an error correction engine mapping 110 providing a mapping of mapping of error correction engines 108 to sectors, such that the mapped error correction engine 108 performs error correction operations and generates error correction information for the mapped sector. In one embodiment, the retention priority assigned to a sector in the sector-retention priority mapping 300 is based on the error correction engine 108 assigned to that sector in the error correction engine mapping 110 and retention capabilities of the cells based on physical characteristics of the cells. The error correction engine mapping 110 and sector-retention priority mapping 300 may be initialized in the controller 102 during manufacture of the storage device 100 and may subsequently be updated during operations.

The error correction engines 108 generate error correction information, e.g., parity codes, block codes, convolutional codes, Reed-Solomon codes, BCH codes, turbo codes, low-density parity-check (LDPC) codes, bit reliability information or soft information, such as Log-Likelihood Ratios (LLRs) etc., for data written to the sectors. In one embodiment, the different error correction engines 108 may use the same error correction algorithm, e.g., LDPC, Reed-Solomon, BCH, etc., but produce error correction information and codes of different lengths. For instance, error correction engines 108 that map to a higher retention priority may produce more error correction information, e.g., error correction bits (soft and hard bits), than the error correction information generated by the error correction engines 108 that map to sectors having a lower retention priority. More error correction information provides improved error recovery capabilities of the data. In a further embodiment, different error correction engines 108 may employ different error correction algorithms, where those algorithms/engines that produce more robust error correction information are mapped to higher retention priority sectors, and lower retention priority sectors map to error correction engines 108 producing less correction information, or providing less robust error correction capabilities. In this way, different error correction engines 108 provide different error resiliency and reliability. The tradeoff of using error correction engines 108 having greater error recovering capabilities is they use more computational resources and consume more storage resources to store their greater error correction information.

The controller 102 further includes a retention priority generator 112 that receives as input retention capability information 114 for different sectors of the storage units $104_1, 104_2 \ldots 104_n$ that is determined by the retention priority generator 112 measuring physical characteristics of the memory cells in the storage units $104_1, 104_2 \ldots 104_n$. The retention priority generator 112 maps the sectors of storage, based on their retention capabilities and the error correction engine 108 mapping to the sectors in the error correction engine mapping 110, to retention priorities based on a retention priority lookup table 200. The retention priority lookup table 200 provides retention priorities for different combinations of error correction engines and retention capability values.

The retention priority generator 112 may determine one of a fixed number of retention capability values in the retention capability information 114 based on measured physical characteristics of the sector memory cells. This generated mapping of sectors to retention priorities, based on the retention capability information 114 for the sectors and assigned error correction engine 108, is stored in the sector-retention priority mapping 300. The retention capability information 114 may be determined during manufacture and later determined periodically by the retention priority generator 112 during operation of the storage device 100 during consumer use.

The retention capabilities 114 for the different sectors of the storage units $104_1, 104_2 \ldots 104_n$ may comprise retention capability values determined from a shmoo plot that describes the performance capabilities of the integrated circuit dies comprising the storage units $104_1, 104_2 \ldots 104_n$ varying over a range of conditions and inputs, which shows the range of conditions in which the device under test operates. The retention capability information 114 maps this determined performance and capability information on the different sectors, expressed through information such as shmoo plots, to retention capability values for the sectors. In another implementation, the retention capabilities of sectors indicated in the retention capability information 114 may be determined from signal integrity (SI) measurements that measures the quality of the signals from different sectors or storage units $104_1, 104_2 \ldots 104_n$. Sectors of storage units $104_1, 104_2 \ldots 104_n$ having better signal integrity (SI) would have greater retention capabilities.

In the described embodiment, the final retention priority assigned to a sector is based on both factors of the retention capabilities of the cells in the sectors, based on the measured physical characteristics of the memory cells, in combination with the error correction engine used for the sectors. In this way, a sector with cells having poor retention capabilities, due to the physical characteristics of the cells, that is subject to a strong error correction engine may have a retention priority matching that for a sector with cells having strong retention capabilities that are subject to a weaker error correction engine. In alternative embodiments, only the assignment of the error correction engine 108 to the sectors may be used to determine retention priorities if retention capability information 114 is not provided.

The storage device further includes a host interface 116 to connect to a computer system 118 over a connection 117, wherein the host interface 116 may implement Serial ATA (SATA), a Peripheral Component Interconnect (PCI) interface, Universal Serial Bus (USB), etc. The computer system 118 includes a processor 119, such as one or more central processing units (CPUs), a memory 120, such as a volatile memory device, e.g., Random Access Memory (RAM), including an operating system 122, whose code is executed by the processor 119. The operating system 122 includes a storage driver 124, executed by the processor 119, to interface with the storage device 100. The storage driver 124 maintains a visibility-retention priority mapping 400 that maps slices or segments of information in a video data stream 128 to retention priorities based on the information type's predicted contribution to the visibility of the rendered output.

For instance, certain decoding information used to decode the encoded video stream 128, such as motion information, decoding coefficients e.g., discrete cosine transform (DCT) coefficients, etc., may have a greater impact on the visibility than other types of information. Further, information on the pixel domain may also indicate which slices or segments of the pixel domain have a greater impact on visibility of the video output. For instance, the video stream 128 may include pixel metadata as an information type, indicating context information about the context or role of the pixels in the video output, such as location with respect to a scene cut (e.g., before or after scene cut), position in the frame (e.g., in center or on the edges of the frame), type of motion the pixels represent, etc.

The effect of an information type of bits in the video stream, e.g., decoding coefficients, motion information, characterizations of the pixel output, may be determined through empirical testing with human subjects who rate the effect on the visibility resulting from the presence and absence of each specific information type. The visibility-retention priority mapping 400 maps an information type of a segment or slice of bits of the video stream 128, e.g., coefficients, motion information, decoding information, context information on a group pixels, etc., to different retention priorities based on the predicted effect the information type on the visibility of the rendered video stream 128. In this way, information types determined to have a greater likely effect on the visibility of the video stream 128 will be assigned a relatively higher retention priority because of the usefulness in having greater retention for those segments of the bits in the video stream 128 that have a greater effect on the visibility and quality of the video stream 128 output.

The storage driver 124 may generate retention metadata 130 of the video stream 128 that identifies segments of bits of the video stream 128 and an assigned retention priority based on the information type of the segments and the associated retention priority in the visibility-retention priority mapping 400. Segments may be identified by a bit location, e.g., offset, and number of bits from the offset, in the video stream 128. Other location identification information may be used to identify the location of a segment mapped in the retention metadata 130.

In alternative embodiments, the data stream may comprise another type of multi-scale error tolerant data other than video stream data. For instance, the multi-sector error tolerant data may comprise sensor data comprising measured sensed values from an environment. Different of the bits that are used to express the measured sensed values may have different retention priorities. For instance, if the measured sensed values comprise a floating point number, the most significant bits of the floating point number may be assigned a high retention priority whereas the least significant bits of the floating point number may have a lower assigned retention priority. In such alternative embodiments, the retention priority mapping 400 may provide mappings for different portions of the multi-sector error tolerant data, such as for different bit locations of a sensed value, to retention priorities. For other types of multi-scale error tolerant data streams, the mapping 400 may map information types having a greater impact on the fidelity of the data to higher priority retentions.

In an alternative embodiment, only one of the retention capability information or the error correction engines may be used to determine the retention priority of a sector, such that a sector's assigned retention priority is based on either the error correction engine assigned to that sector or the retention capability information provided for that sector. In this way, those segments of the video stream (or other multi-scale error tolerant data) having a greater predicted effect on visibility (or less error tolerance) are assigned a higher retention priority, which results in assignment to sectors having a relatively more robust error correction engine or having higher retention capabilities.

In FIG. 1, certain information used by the controller 102, used to determine the mapping of sectors to priority information, such as mappings and information 110, 114, 200, 300 are shown as encoded in the controller 102 circuitry and memory. In alternative embodiments, this information may be stored in the storage units $104_1, 104_2 \ldots 104_n$ and loaded into the controller 102 for execution.

FIG. 2 illustrates an embodiment of an entry $200_i$, in the retention priority lookup table 200 that provides a retention priority 202 when the sector has a retention capability 204 value and assigned error correction engine 206. In this way, the retention priority generator 112 or read/write logic 106 can determine the retention priority that should be assigned to a given retention capability and assigned error correction engine 206 for a sector.

In alternative embodiments, techniques other than a lookup table 200 may be used to assign retention priorities based on retention capability values and error correction engines, such as a function or other mapping technique.

FIG. 3 illustrates an embodiment of an instance of a sector-retention priority mapping $300_i$ for a sector, which includes sector 302, which may be expressed in terms of a die identifier, partition or location in the die where the sector 302 is located, and a retention priority 304 associated with the sector 302. A sector 302 may comprise one or more dies, or a specific region of a die.

FIG. 4 illustrates an embodiment of an instance of visibility-retention priority mapping $400_i$ including an information type 402 providing a categorization of bits of the video stream, such as decoding coefficients, motion information, DCT coefficients, and characterizations of the pixel data, such as location of pixel bits with respect to scene types, location in the frame, etc., and a retention priority 404 associated with that information type 402. As discussed, information types of video stream bits having a greater impact on the predicted visibility of the video stream 126 are assigned a higher retention priority 404 so that they are assigned to a sector in the storage units $104_1, 104_2 \ldots 104_n$ having greater retention and recovery capabilities. In alternative embodiments where the data stream comprises multi-scale error tolerant streams other than a video stream, the information type 402 may comprise other types of data from the data stream, such as least significant bits versus most significant bits.

FIG. 5 illustrates an instance of retention metadata $500_i$ generated by the storage driver 124 that identifies a segment 502 in the video stream 126 comprising a group of bits associated with a specified information type and a retention priority 504 for that segment.

Figure 6:
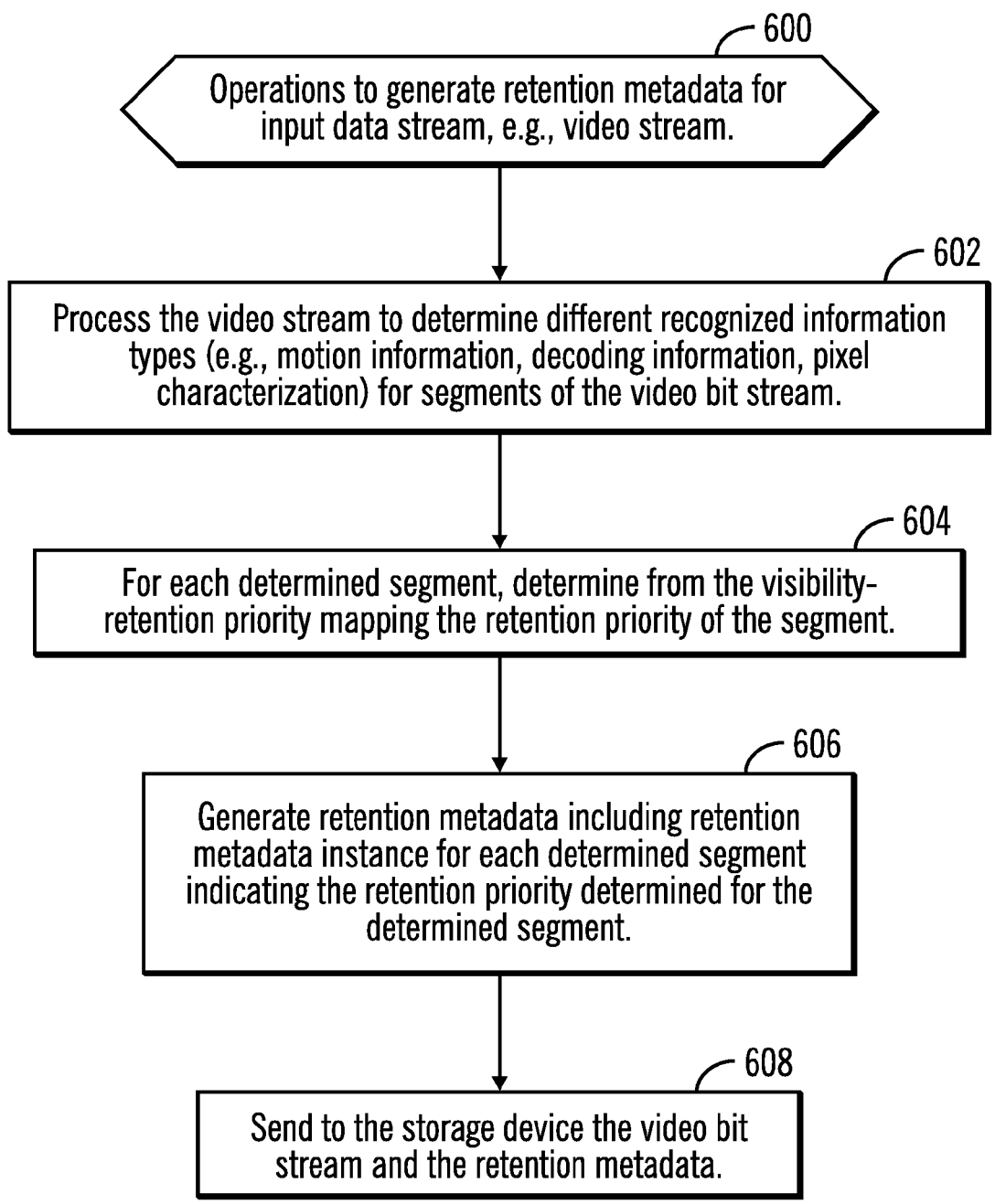
FIG. 6 illustrates an embodiment of operations to generate retention metadata for an input data stream.

FIG. 6 illustrates an embodiment of operations performed by the storage driver 124 to generate retention metadata 500 for an input data stream 128, such as a video data stream. The storage driver 124 processes (at block 602) the video stream 128 to determine different recognized information types (e.g., motion information, decoding information, pixel characterization) for segments of the video bit stream 128. For other multi-scale error tolerant data streams, the recognized information types may comprise a bit location for values, etc. The information types for segments of data may be indicated in metadata for the video stream 128 or determined by processing the content of the video stream 128. For each determined segment, the storage driver 124 determines (at block 604) from the visibility-retention priority mapping 400 the retention priority 404 for the information type 402 provided in the visibility-retention priority mapping instance $400_i$ for the segment. The storage driver 124 generates (at block 606) the retention metadata 500 having a retention metadata instance $500_i$ for each determined segment 502 indicating the retention priority 504 determined for the determined segment from the visibility-retention priority mapping 400. The storage driver 124 then sends (at block 608) to the storage device 100 the video bit stream 128 and the retention metadata 500.

Figure 7:
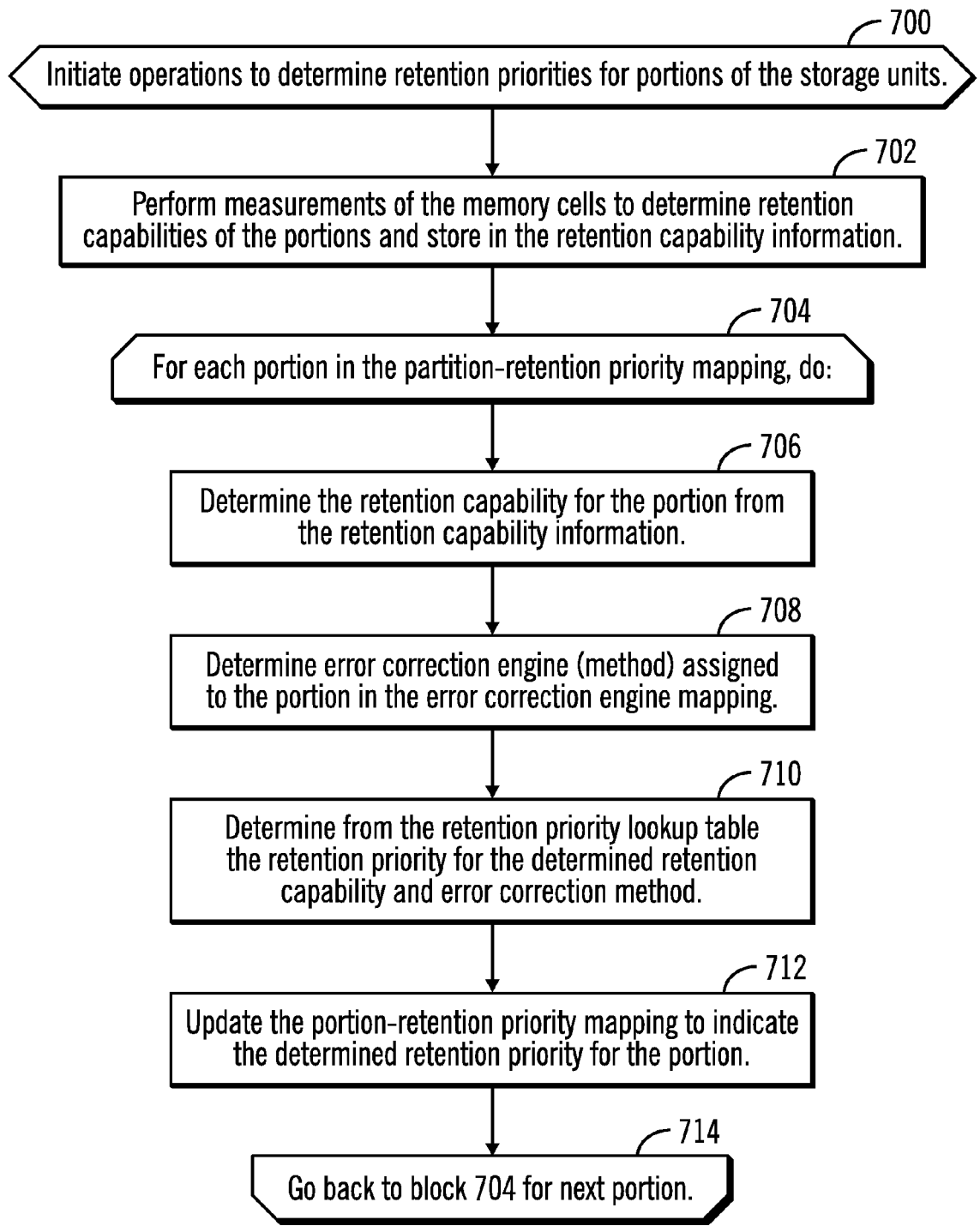
FIG. 7 illustrates an embodiment of operations to determine retention priorities for sectors of storage units in the storage device.

FIG. 7 illustrates an embodiment of operations performed by the retention priority generator 112 to determine retention priority for sectors of the storage units $104_1, 104_2 \ldots 104_n$ for embodiments where the sector-retention priority mapping 300 is based on the performance characteristics of the sectors, i.e., retention capability information 210. The operations of FIG. 7 may be performed after production and periodically while the storage device 100 is in use by a consumer. Upon initiating (at block 700) operations to determine retention priorities based on the retention capability information 114, the retention priority generator 112 performs (at block 702) measurements of the physical characteristics of the memory cells of the sectors to determine retention capabilities of the sectors and store retention capability values for the sectors in the retention capability information 114. For each sector in the sector-retention priority mapping 300, a loop of operations is performed at blocks 704 through 714. At block 706, the retention capability for the sector is determined from the retention capability information 114. The error correction engine 108 assigned to the sector, as indicated in the error correction engine mapping 110, is determined (at block 708). The retention priority generator 112 determines (at block 710) from the retention priority lookup table 200 the retention priority 202 for the determined retention capability 204 and error correction engine 206 assigned to the sector in the error correction engine mapping 110. The sector-retention priority mapping $300_i$ entry for the sector is updated to indicate the determined retention priority 202 as the retention priority 304 for that sector 302.

With the described operations of the controller 102 of FIG. 7, the sector-retention priority mapping $300i$ is determined based on statistics of the capabilities, qualities and integrity of sectors in the storage units $104_1, 104_2 \ldots 104_n$ provided in the retention capability information 114 and the assigned error correction engine 108. The operations of FIG. 7 may be periodically initiated when the storage device 100 is deployed in the field to recalculate the retention capability information 114 based on the current capabilities and physical characteristics of the memory cells of the storage units $104_1, 104_2 \ldots 104_n$. The retention priority generator 112 may rescan the memory cells of the sectors to determine updated retention capability information 114 based on the current physical characteristics and wear of the memory cells of the sectors. The operations of FIG. 7 may also be performed after production, before the storage device 100 is sold or distributed to users to provide initial values or the retention capability information and sector-retention priority mapping 300.

Figure 8A:
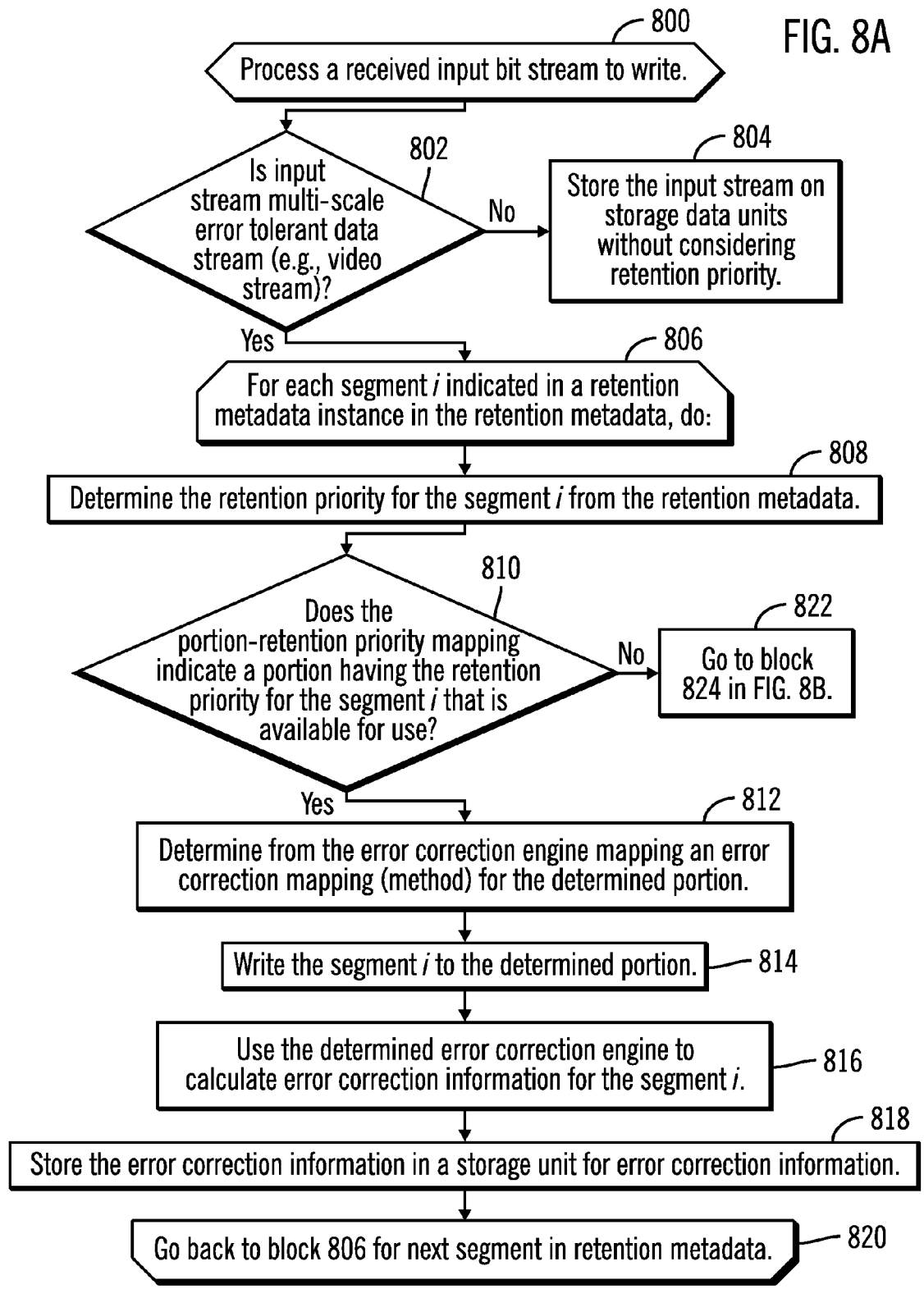
FIGS. 8*a* and 8*b* illustrate an embodiment of operations to process a received input data stream to write.
Figure 8B:
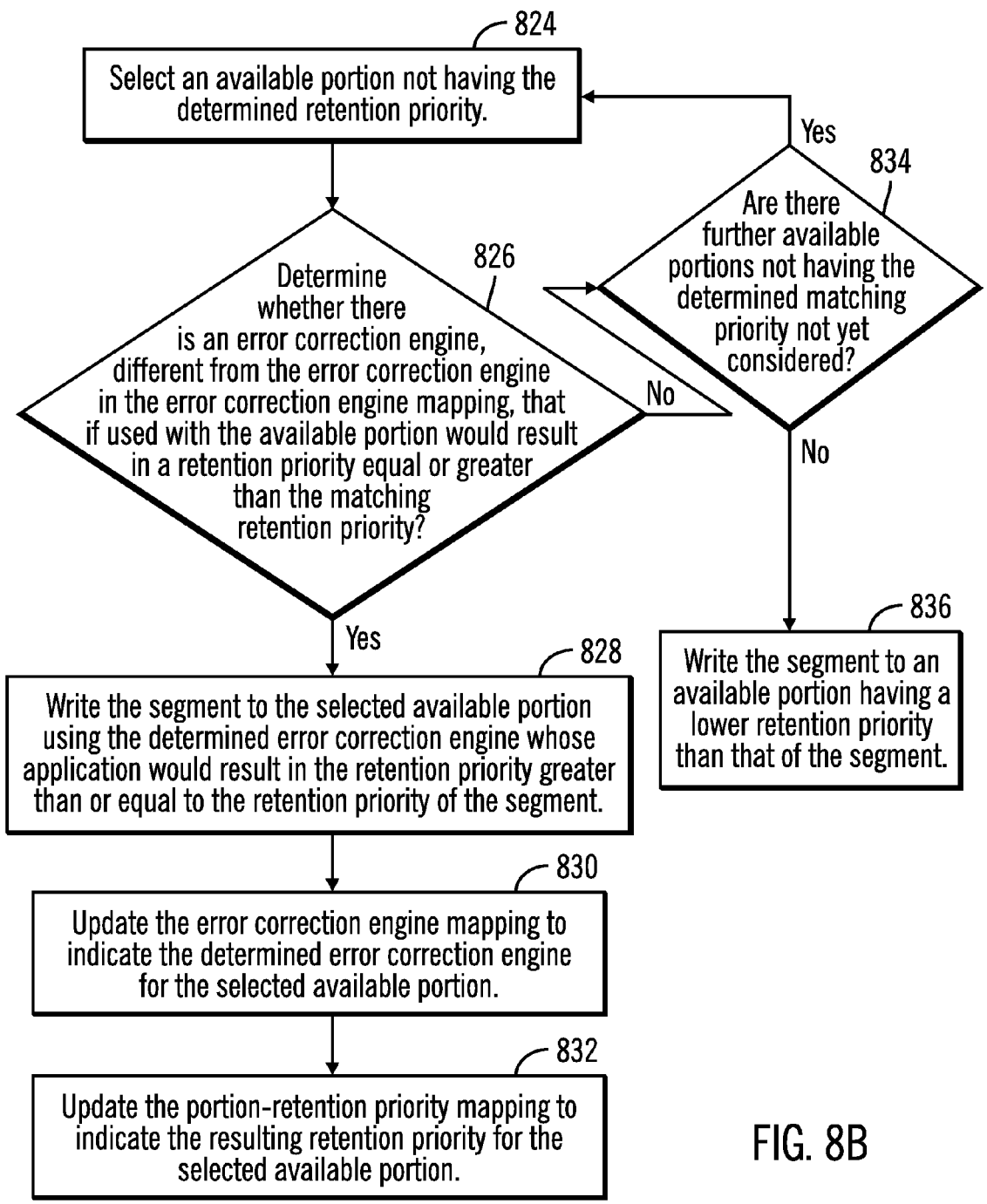

FIGS. 8a and 8b illustrate an embodiment of operations performed by the read/write logic 106, 206 to process the input data stream 128. Upon receiving (at block 800) the data stream 128 to write, such as a multi-scale error tolerant stream, the read/write logic 106 determines (at block 802) whether the input data stream is one for which retention metadata 500 is provided, such as a multi-scale error tolerant stream. If not (from the no branch of block 802), then the read/write logic 106 stores (at block 804) the data stream on storage units $104_1, 104_2 \ldots 104_1$, without considering the retention priority and sector-retention priority mapping 300. If (at block 802) the data stream is sent with retention metadata 500, then control proceeds to perform the operations at blocks 806 through 820 for each segment i 502 indicated in a retention metadata instance $500i$ of the retention metadata 500.

At block 808, read/write logic 106 determines the retention priority 504 for the segment 502 from the retention metadata instance $500_i$. A determination is made (at block 810) whether the sector-retention priority mapping 300 indicates a sector having the retention priority for the segment i that is available for use. If there is an available sector having the retention priority for the segment 502, then the read/write logic 106 determines (at block 812) from the error correction engine mapping 110 an error correction engine 108 for the sector. The segment is written (at block 814) to the determined sector i and the determined error correction engine 108 is used (at block 816) to calculate error correction information for the segment i. The generated error correction information is stored (at block 818) in one of the storage units $104_1, 104_2 \ldots 104_n$. There may be a specific parity storage unit to store error correction data for the storage unit to which the segment is written.

If (at block 810) there is no available sector having a retention priority as indicated in the sector-retention priority mapping 300 that matches the retention priority of the segment i to write, then control proceeds (at block 822) to block 824 in FIG. 8b. At block 824, the read/write logic 106 selects an available sector in the storage units $104_1, 104_2 \ldots 104_n$ and determines (at block 826) whether there is an error correction engine 108, different from the error correction engine indicated in the error correction engine mapping 110, that if used with the selected available sector would result in a retention priority equal or greater than the matching retention priority matching the retention priority of the segment i. In one embodiment, this determination may consider the retention priority lookup table 200 to determine if there is an error correction engine 206 that if used with the selected available sector having a retention capability 204 would result in a retention priority 202 greater or equal to that of the segment i. If multiple error correction engines 108 satisfy this requirement, then the one with the lowest retention priority satisfying the requirement would be selected for use with the selected available sector.

In an additional embodiment, in addition to determining a new error correction engine 108, the read/write logic 106 may separately or additionally determine an alternate access scheme correlated with different error resiliency (e.g., access concurrency in the controller 102 is traded-off with bandwidth/latency and reliability).

If (at block 826) there is an error correction engine 108 determined that satisfies the condition of block 826, then the read/write logic 106 writes (at block 828) the segment i to the selected available sector using the determined error correction engine 108 whose application would result in the retention priority greater than or equal to the retention priority of the segment i. The error correction engine mapping 110 may then be updated (at block 830) to indicate the determined error correction engine 108 for the selected available sector. The sector-retention mapping entry $300_i$ for the selected available sector is updated (at block 832) to indicate the resulting retention priority from applying the determined error correction engine 108.

If (at block 826) there is no error correction engine that if used with the selected available sector would result in a retention priority greater or equal to that of the segment i, then if (at block 834) there are further available sectors to consider, then control proceeds back to block 824 to consider a next available sector to use. If (at block 834) there are no further available sectors to considers, then the segment may be written (at block 836) to an available sector having a lower retention priority than that of the segment i. An error may also be thrown if the segment is written to a lower retention sector.

Described embodiments provide an error tolerant aware data retention scheme that assigns retention priorities to segments of a data stream, such as a multi-scale error tolerant data stream (e.g., video stream, sensor stream) based on the content or information type of the segment's error tolerance (e.g., predicted effect on the visibility of the data for a video stream or quality of the data for other uses). The storage device maintains a mapping of sectors in the storage units, such as memory cells, of the storage device to retention priorities, so that a segment is stored in a sector commensurate with the retention priority of the segment. In this way, segments that have a less error tolerance (e.g., greater predicted effect on the visibility or usefulness of the data) are stored in sectors having greater retention capabilities, and segments having greater error tolerance (e.g., less of an effect on visibility or data usefulness) are assigned to sectors having lower retention capabilities. This minimizes the damage to the fidelity of the data by reducing the likelihood that segments of data predicted to have lower error retention (e.g., a significant effect on the visibility or utility of the data) are lost.

Figure 9:
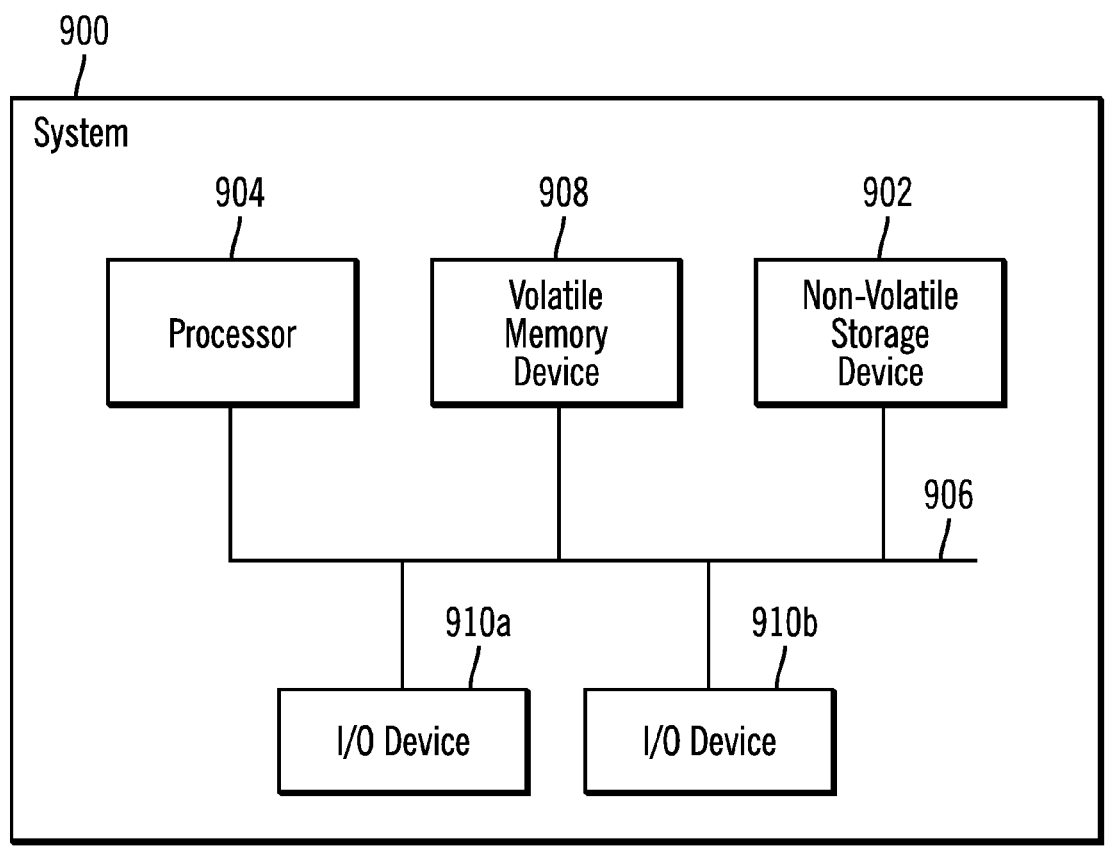
FIG. 9 illustrates a computer system in which the computer system and storage device of FIG. 1 may be deployed.

FIG. 9 illustrates an embodiment of a computer system 900 implementation, such as for the computer system 118, including a non-volatile storage device 902, such as storage device 100 of FIG. 1. The system 900 includes a processor 904 that communicates over a bus 906 with a volatile memory device 908, such as memory 120, in which programs, operands and parameters, such as operating system 122 and storage driver 124, being executed are cached and the non-volatile storage device 902, in which data and programs may be stored. The processor 904 may also communicate with Input/Output (I/O) devices 910a, 910b, which may comprise input devices, display devices, graphics cards, ports, network interfaces, etc. The non-volatile storage device 902 may be mounted to the system 900 enclosure, such as in a storage drive bay, or connected to the system 900 through a port interface or over the network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the memory controller 102 and the components 106, 108, 110, 112, 114, 200, 300, and other components, may be implemented as a method, apparatus, device, computer program product comprising a computer readable storage medium using standard programming and/or engineering techniques to produce software, firmware, hardware, or any combination thereof. The described operations may be implemented as code or logic maintained in a "computer readable storage medium", which may comprise an integrated circuit device, such as an Application Specific Integrated Circuit (ASIC), to directly execute the functions or where a processor may read and execute the code from the computer storage readable medium. The computer readable storage medium includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is an apparatus for an error tolerance aware data retention scheme for multi-scale error tolerant data comprising: a plurality of storage units; and a controller coupled to the storage units that is configured to: provide a mapping of retention priorities to sectors of the storage units, wherein higher retention priorities map to sectors having a higher retention capability; receive a data stream and retention metadata for the data stream indicating retention priorities for segments of the data stream, wherein segments of the data stream having less error tolerance are mapped to higher retention priorities than segments of the data stream having greater error tolerance; use the mapping of retention priorities to determine a sector having a retention priority matching a retention priority of a segment of the data stream indicated in the retention metadata; and store the segment of the data stream in the determined sector.

In Example 2, the subject matter of examples 1, and 3-10 can optionally include that the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

In Example 3, the subject matter of examples 1, 2, and 4-10 can optionally include that the controller is further to: determine whether the received data stream comprises a multi-scale error tolerant data stream, wherein the use of the mapping of retention priorities to determine the sector is performed in response to determining that the received data stream comprises the multi-scale error tolerant data stream providing retention metadata providing retention priorities for the segments in the data stream; and write the data stream to the storage units without using the mapping of retention priorities in response to determining that the received data stream does not comprise the multi-scale error tolerant data stream.

In Example 4, the subject matter of examples 1-3 and 5-10 can optionally include that each of the storage units comprise integrated circuit dies and wherein each of the sectors with which retention priorities are associated comprise at least one die, and wherein a segment of the data stream is written to one of the integrated circuit dies associated with the retention priority with which the segment is associated in the retention metadata.

In Example 5, the subject matter of examples 1-4 and 6-10 can optionally include that the controller is further to: maintain an association of error correction engines to the sectors; and use one of the error correction engines indicated in the association of error correction engines for the sector to which the segment is to be written to generate error correction information for the segment to write to the storage units, wherein the error correction engines comprise different error correction techniques.

In Example 6, the subject matter of examples 1-4 and 7-10 can optionally include that the controller is further to: provide retention capabilities of the sectors based on measured physical characteristics of the sectors; wherein the mapping of retention priority to one of the sectors is based on a combination of a retention capability of the sector and the error correction engine associated with the sector in the association of error correction engines.

In Example 7, the subject matter of examples 1-7 and 8-10 can optionally include that the retention capabilities of the sectors are determined during manufacture of the apparatus and subsequently during apparatus operations subsequent to distribution of the apparatus to a user.

In Example 8, the subject matter of examples 1-7 and 9-10 can optionally include that the controller is further to process each of the segments in the data stream by: determine whether the mapping of retention priorities indicates an available sector assigned a matching retention priority matching the retention priority of the segment, wherein the indicated available sector is used to store the segment in response to determining that the mapping of retention priorities indicates the available sector;

select an available sector not having the matching retention priority in response to determining that the mapping of retention priorities does not indicate an available sector having the matching retention priority; determine an error correction engine other than the error correction engine indicted in the association of error correction engines that when used with the selected available sector would result in a retention priority equal or greater than the matching retention priority; and write the segment to the selected available sector using the determined error correction engine instead of the error correction engine assigned to the sector in the association of error correction engines.

In Example 9, the subject matter of examples 1-8 and 10 can optionally include that the controller is further to: update the association of error correction engines to indicate the determined error correction engine for the available sector; and update the mapping of retention priorities to indicate the matching retention priority for the available sector.

In Example 10, the subject matter of examples 1-9 can optionally include that the controller is further to: for each of the sectors, perform: determine a retention capability of the sector based on measured physical characteristics of the sector; determine an error correction engine assigned to the sector according to an error correction engine assignment; determine a retention priority for the determined retention capability and the determined error correction engine; and set the retention priority for the sector in the mapping of retention priorities to the determined retention priority.

Example 11 is a computer program product for an error tolerance aware data retention scheme for multi-scale error tolerant data including a computer readable storage media having a storage device driver executed by a processor to transfer data to a storage device and to: maintain a mapping of information types to retention priorities; process a received data stream to determine information types of segments in the received data stream; determine retention priorities for the segments in the received data stream based on the information types of the segments and the retention priorities assigned to the information types in the mapping of information types, wherein the information types having greater error tolerance are mapped to higher retention priorities than information types having greater error tolerance; generate retention metadata indicating the retention priorities for the segments in the data stream; and send the retention metadata and the data stream to the storage device to store the segments in sectors of the storage device associated with retention priorities of the segments indicated in the retention metadata.

In Example 12, the subject matter of examples 11, 13, and 14 can optionally include that the data stream comprises a video bit stream and wherein the mapping of information types in the video bit stream is based on a loss visibility model to map segments in the video bit stream having information with a greater effect on visibility with a higher retention priority than a segment having information having less of an effect on visibility according to the loss visibility model.

In Example 13, the subject matter of examples 11, 12, and 14 can optionally include that the information types assigned retention priorities include motion information, encoding information used to decode and encode the video bit stream, and sections of a pixel domain based on characteristics of regions of pixels, wherein regions of pixels in frames of the video bit stream having a higher effect on visibility are assigned a higher priority than regions of pixels in the frames having less of an effect on visibility.

Example 14 is a system for an error tolerance aware data retention scheme for multi-scale error tolerant data, comprising: a processor; a storage device having a controller and a plurality of storage units; a computer readable storage media having a storage device driver executed by the processor to transfer data to the storage device and to: maintain a mapping of information types to retention priorities; process a received data stream to determine information types of segments in the received data stream; determine retention priorities for the segments in the received data stream based on the information types of the segments and the retention priorities assigned to the information types in the mapping of information types, wherein the information types having greater error tolerance are mapped to higher retention priorities than information types having greater error tolerance; generate retention metadata indicating the retention priorities for the segments in the data stream; and send the retention metadata and the data stream to the storage device; and wherein the controller of the storage device is coupled to the storage units and is configured to: provide a mapping of retention priorities to sectors of the storage units, wherein higher retention priorities map to sectors having a higher retention capability; receive the data stream and the retention metadata; use the mapping of retention priorities to determine a sector having a retention priority matching a retention priority of a segment of the data stream indicated in the retention metadata; and storing the segment of the data stream in the determined sector.

In Example 15, the subject matter of examples 14, 16, and 17 can optionally include that the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

In Example 16, the subject matter of examples 14, 15, and 17 can optionally include that the controller is further to: maintain an association of error correction engines to the sectors; and use one of the error correction engines indicated in the association of error correction engines for the sector to which the segment is to be written to generate error correction information for the segment to write to the storage units, wherein the error correction engines comprise different error correction techniques.

In Example 17, the subject matter of examples 14-16 can optionally include that the controller is further to: for each of the sectors, perform: determine a retention capability of the sector based on measured physical characteristics of the sector; determine an error correction engine assigned to the sector according to an error correction engine assignment; determine a retention priority for the determined retention capability and the determined error correction engine; and set the retention priority for the sector in the mapping of retention priorities to the determined retention priority.

Example 18 is a method for an error tolerance aware data retention scheme for multi-scale error tolerant data in storage units of a storage device, comprising: providing a mapping of retention priorities to sectors of the storage units, wherein higher retention priorities map to sectors having a higher retention capability; receiving a data stream and retention metadata for the data stream indicating retention priorities for segments of the data stream, wherein segments of the data stream having less error tolerance are mapped to higher retention priorities than segments of the data stream having greater error tolerance; using the mapping of retention priorities to determine a sector having a retention priority matching a retention priority of a segment of the data stream indicated in the retention metadata; and storing the segment of the data stream in the determined sector.

In Example 19, the subject matter of examples 18, and 20-26 can optionally include that the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

In Example 20, the subject matter of examples 18, 19, and 21-26 can optionally include determining whether the received data stream comprises a multi-scale error tolerant data stream, wherein the use of the mapping of retention priorities to determine the sector is performed in response to determining that the received data stream comprises the multi-scale error tolerant data stream providing retention metadata providing retention priorities for the segments in the data stream; and writing the data stream to the storage units without using the mapping of retention priorities in response to determining that the received data stream does not comprise the multi-scale error tolerant data stream.

In Example 21, the subject matter of examples 18-20 and 22-26 can optionally include maintaining an association of error correction engines to the sectors; and using one of the error correction engines indicated in the association of error correction engines for the sector to which the segment is to be written to generate error correction information for the segment to write to the storage units, wherein the error correction engines comprise different error correction techniques.

In Example 22, the subject matter of examples 18-21 and 23-26 can optionally include providing retention capabilities of the sectors based on measured physical characteristics of the sectors; wherein the mapping of retention priority to one of the sectors is based on a combination of a retention capability of the sector and the error correction engine associated with the sector in the association of error correction engines.

In Example 23, the subject matter of examples 18-22 and 24-26 can optionally include processing each of the segments in the data stream by: determining whether the mapping of retention priorities indicates an available sector assigned a matching retention priority matching the retention priority of the segment, wherein the indicated available sector is used to store the segment in response to determining that the mapping of retention priorities indicates the available sector; selecting an available sector not having the matching retention priority in response to determining that the mapping of retention priorities does not indicate an available sector having the matching retention priority; determining an error correction engine other than the error correction engine indicted in the association of error correction engines that when used with the selected available sector would result in a retention priority equal or greater than the matching retention priority; and writing the segment to the selected available sector using the determined error correction engine instead of the error correction engine assigned to the sector in the association of error correction engines.

In Example 24, the subject matter of examples 18-23 and 25-26 can optionally include updating the association of error correction engines to indicate the determined error correction engine for the available sector; and updating the mapping of retention priorities to indicate the matching retention priority for the available sector.

In Example 25, the subject matter of examples 18-24 and 26 can optionally include that for each of the sectors, perform: determining a retention capability of the sector based on measured physical characteristics of the sector; determining an error correction engine assigned to the sector according to an error correction engine assignment; determining a retention priority for the determined retention capability and the determined error correction engine; and set the retention priority for the sector in the mapping of retention priorities to the determined retention priority.

In Example 26, the subject matter of example 18 can optionally at least any one of:

(1) wherein the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream; and/or (2) determining whether the received data stream comprises a multi-scale error tolerant data stream, wherein the use of the mapping of retention priorities to determine the sector is performed in response to determining that the received data stream comprises the multi-scale error tolerant data stream providing retention metadata providing retention priorities for the segments in the data stream; and writing the data stream to the storage units without using the mapping of retention priorities in response to determining that the received data stream does not comprise the multi-scale error tolerant data stream; and/or (3) wherein each of the storage units comprise integrated circuit dies and wherein each of the sectors with which retention priorities are associated comprise at least one die, and wherein a segment of the data stream is written to one of the integrated circuit dies associated with the retention priority with which the segment is associated in the retention metadata; and/or (4) maintaining an association of error correction engines to the sectors; and using one of the error correction engines indicated in the association of error correction engines for the sector to which the segment is to be written to generate error correction information for the segment to write to the storage units, wherein the error correction engines comprise different error correction techniques; and/or (5) providing retention capabilities of the sectors based on measured physical characteristics of the sectors; wherein the mapping of retention priority to one of the sectors is based on a combination of a retention capability of the sector and the error correction engine associated with the sector in the association of error correction engines; and/or (6) wherein the retention capabilities of the sectors are determined during manufacture of the apparatus and subsequently during apparatus operations subsequent to distribution of the apparatus to a user; and/or (7) processing each of the segments in the data stream by: determining whether the mapping of retention priorities indicates an available sector assigned a matching retention priority matching the retention priority of the segment, wherein the indicated available sector is used to store the segment in response to determining that the mapping of retention priorities indicates the available sector; selecting an available sector not having the matching retention priority in response to determining that the mapping of retention priorities does not indicate an available sector having the matching retention priority; and determining an error correction engine other than the error correction engine indicted in the association of error correction engines that when used with the selected available sector would result in a retention priority equal or greater than the matching retention priority; and writing the segment to the selected available sector using the determined error correction engine instead of the error correction engine assigned to the sector in the association of error correction engines; and/or (8) updating the association of error correction engines to indicate the determined error correction engine for the available sector; and updating the mapping of retention priorities to indicate the matching retention priority for the available sector; and/or (9) for each of the sectors, performing: determining a retention capability of the sector based on measured physical characteristics of the sector; determining an error correction engine assigned to the sector according to an error correction engine assignment; determining a retention priority for the determined retention capability and the determined error correction engine; and setting the retention priority for the sector in the mapping of retention priorities to the determined retention priority.

Example 27 is an apparatus for an error tolerance aware data retention scheme for multi-scale error tolerant data in storage units of a storage device, comprising: means for providing a mapping of retention priorities to sectors of the storage units, wherein higher retention priorities map to sectors having a higher retention capability; means for receiving a data stream and retention metadata for the data stream indicating retention priorities for segments of the data stream, wherein segments of the data stream having less error tolerance are mapped to higher retention priorities than segments of the data stream having greater error tolerance; means for using the mapping of retention priorities to determine a sector having a retention priority matching a retention priority of a segment of the data stream indicated in the retention metadata; and means for storing the segment of the data stream in the determined sector.

In Example 28, the subject matter of example 27 can optionally include: means for maintaining an association of error correction engines to the sectors; and means for using one of the error correction engines indicated in the association of error correction engines for the sector to which the segment is to be written to generate error correction information for the segment to write to the storage units, wherein the error correction engines comprise different error correction techniques.

Example 29 is an apparatus comprising means to perform a method as claimed in any preceding claim.

Example 30 is a machine-readable storage including machine-readable instructions, when executed, to implement a method or realize an apparatus or system as claimed in any preceding claim.

What is claimed:

1. An apparatus comprising:
a plurality of storage units; and
a controller coupled to the storage units that is configured to:
provide a mapping of retention priorities to sectors of the storage units, wherein higher retention priorities map to sectors having a higher retention capability;
receive a data stream;
determine whether retention metadata providing retention priorities for segments in the data stream is provided for the data stream, wherein, in retention metadata, segments of the data stream having less error tolerance have higher retention priorities than segments of the data stream having greater error tolerance;
in response to a determination that the retention metadata is provided with the data stream, perform:
use the mapping of retention priorities to determine a sector having a retention priority matching a retention priority of a segment of the data stream indicated in the retention metadata; and
store the segment of the data stream in the determined sector; and
write the data stream to the storage units without using the mapping of retention priorities in response to determining that retention metadata is not provided for the data stream.

2. The apparatus of claim 1, wherein the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

3. The apparatus of claim 1, wherein each of the storage units comprise integrated circuit dies and wherein each of the sectors with which retention priorities are associated comprise at least one die, and wherein a segment of the data stream is written to one of the integrated circuit dies associated with the retention priority with which the segment is associated in the retention metadata.

4. The apparatus of claim 1, wherein the controller is further to:
for each sector of the sectors, perform:
determine a retention capability of the sector based on measured physical characteristics of the sector;
determine an error correction engine assigned to the sector according to an error correction engine assignment;
determine a retention priority for the determined retention capability and the determined error correction engine; and
set the retention priority for the sector in the mapping of retention priorities to the determined retention priority.

5. An apparatus comprising:
a plurality of storage units; and
a controller coupled to the storage units that is configured to:
provide a mapping of retention priorities to sectors of the storage units, wherein higher retention priorities map to sectors having a higher retention capability;
receive a data stream and retention metadata for the data stream indicating retention priorities for segments of the data stream, wherein segments of the data stream having less error tolerance are mapped to higher retention priorities than segments of the data stream having greater error tolerance;
use the mapping of retention priorities to determine a sector having a retention priority matching a retention priority of a segment of the data stream indicated in the retention metadata; and
store the segment of the data stream in the determined sector;
maintain an association of error correction engines to the sectors; and
use one of the error correction engines indicated in the association of error correction engines for the sector to which the segment is to be written to generate error correction information for the segment to write to the storage units, wherein the error correction engines comprise different error correction techniques.

6. The apparatus of claim 5, wherein the controller is further to:
provide retention capabilities of the sectors based on measured physical characteristics of the sectors;
wherein the mapping of retention priorities includes a mapping of a retention priority of the retention priorities to a sector of the sectors is based on a combination of a retention capability of the sector and an error correction engine of the error correction engines associated with the sector in the association of error correction engines.

7. The apparatus of claim 6, wherein the retention capabilities of the sectors are determined during manufacture of the apparatus and subsequently during apparatus operations subsequent to distribution of the apparatus to a user.

8. The apparatus of claim 5, wherein the controller is further to process each of the segments in the data stream to:
determine whether the mapping of retention priorities indicates an available sector assigned a matching retention priority matching the retention priority of the segment, wherein the indicated available sector is used to store the segment in response to determining that the mapping of retention priorities indicates the available sector;
select an available sector not having the matching retention priority in response to determining that the mapping of retention priorities does not indicate an available sector having the matching retention priority;
determine an error correction engine other than the error correction engine indicted in the association of error correction engines that when used with the selected available sector would result in a retention priority equal or greater than the matching retention priority; and
write the segment to the selected available sector using the determined error correction engine instead of the error correction engine assigned to the selected available sector in the association of error correction engines.

9. The apparatus of claim 8, wherein the controller is further to:
- update the association of error correction engines to indicate the determined error correction engine for the available sector; and
- update the mapping of retention priorities to indicate the matching retention priority for the available sector.

10. A computer program product including a non-transitory computer readable storage media having a storage device driver executed by a processor to transfer data to a storage device and to:
- maintain a mapping of information types to retention priorities;
- process a received video bit stream to determine information types of segments in the received video bit stream based on a loss visibility model to map segments in a video bit stream having information with a greater effect on visibility with a higher retention priority than a segment having information having less of an effect on visibility according to the loss visibility model;
- determine retention priorities for the segments in the received video bit stream based on the information types of the segments and the retention priorities assigned to the information types in the mapping of information types, wherein the information types assigned retention priorities include at least one of motion information, encoding information used to decode and encode the video bit stream, and sections of a pixel domain based on characteristics of regions of pixels, wherein regions of pixels in frames of the video bit stream having a higher effect on visibility are assigned a higher priority than regions of pixels in the frames having less of an effect on visibility;
- generate retention metadata indicating the retention priorities for the segments in the video bit stream; and
- send the retention metadata and the video bit stream to the storage device to store the segments in sectors of the storage device associated with retention priorities of the segments indicated in the retention metadata.

11. A system, comprising:
- a processor;
- a storage device having a controller and a plurality of storage units;
- a computer readable storage media having a storage device driver executed by the processor to transfer data to the storage device and to:
  - maintain a mapping of information types to retention priorities;
  - process a received data stream to determine information types of segments in the received data stream;
  - determine retention priorities for the segments in the received data stream based on the information types of the segments and the retention priorities assigned to the information types in the mapping of information types, wherein the information types having greater error tolerance are mapped to higher retention priorities than information types having greater error tolerance;
  - generate retention metadata indicating the retention priorities for the segments in the data stream; and
  - send the retention metadata and the data stream to the storage device; and
- wherein the controller of the storage device is coupled to the storage units and is configured to:
  - provide a mapping of retention priorities to sectors of the storage units, wherein higher retention priorities map to sectors having a higher retention capability;
  - receive the data stream;
  - determine whether retention metadata providing retention priorities for segments in the data stream is provided for the received data stream, wherein, in retention metadata, segments of the data stream having less error tolerance have higher retention priorities than segments of the data stream having greater error tolerance;
  - in response to a determination that the retention metadata is provided with the received data stream, perform:
    - use the mapping of retention priorities to determine a sector having a retention priority matching a retention priority of a segment of the data stream indicated in the retention metadata; and
    - store the segment of the data stream in the determined sector; and
  - write the data stream to the storage units without using the mapping of retention priorities in response to determining that retention metadata is not provided for the received data stream.

12. The system of claim 11, wherein the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

13. The system of claim 11, wherein the controller is further to:
- maintain an association of error correction engines to the sectors; and
- use one of the error correction engines indicated in the association of error correction engines for the sector to which the segment is to be written to generate error correction information for the segment to write to the storage units, wherein the error correction engines comprise different error correction techniques.

14. The system of claim 11, wherein the controller is further to:
- for each of the sectors, perform:
  - determine a retention capability of the sector based on measured physical characteristics of the sector;
  - determine an error correction engine assigned to the sector according to an error correction engine assignment;
  - determine a retention priority for the determined retention capability and the determined error correction engine; and
  - set the retention priority for the sector in the mapping of retention priorities to the determined retention priority.

15. A method for storing data in storage units of a storage device, comprising:
- providing a mapping of retention priorities to sectors of the storage units, wherein higher retention priorities map to sectors having a higher retention capability;
- receiving a data stream;
- determine whether retention metadata providing retention priorities for segments in the data stream is provided for the data stream, wherein, in retention metadata, segments of the data stream having less error tolerance have higher retention priorities than segments of the data stream having greater error tolerance;

in response to a determination that the retention metadata is provided with the data stream, perform:

using the mapping of retention priorities to determine a sector having a retention priority matching a retention priority of a segment of the data stream indicated in the retention metadata; and storing the segment of the data stream in the determined sector; and write the data stream to the storage units without using the mapping of retention priorities in response to determining that retention metadata is not provided for the data stream.

16. The method of claim 15, wherein the data stream comprises a video data stream, wherein the segments are mapped to retention policies based on a loss visibility model which maps segments of the video data stream that have a greater effect on a visibility of the video data stream to a higher retention priority than retention priorities for segments having less of an effect on the visibility of the video data stream.

17. The method of claim 15, further comprising:

for each sector of the sectors, perform:

determining a retention capability of the sector based on measured physical characteristics of the sector;

determining an error correction engine assigned to the sector according to an error correction engine assignment;

determining a retention priority for the determined retention capability and the determined error correction engine; and set the retention priority for the sector in the mapping of retention priorities to the determined retention priority.

18. A method for storing data in storage units of a storage device, comprising:

providing a mapping of retention priorities to sectors of the storage units, wherein higher retention priorities map to sectors having a higher retention capability;

receiving a data stream and retention metadata for the data stream indicating retention priorities for segments of the data stream, wherein segments of the data stream having less error tolerance are mapped to higher retention priorities than segments of the data stream having greater error tolerance;

using the mapping of retention priorities to determine a sector having a retention priority matching a retention priority of a segment of the data stream indicated in the retention metadata; and storing the segment of the data stream in the determined sector;

maintaining an association of error correction engines to the sectors; and using one of the error correction engines indicated in the association of error correction engines for the sector to which the segment is to be written to generate error correction information for the segment to write to the storage units, wherein the error correction engines comprise different error correction techniques.

19. The method of claim 18, further comprising:

providing retention capabilities of the sectors based on measured physical characteristics of the sectors;

wherein the mapping of retention priorities includes a mapping of a retention priority of the retention priorities to a sector of the sectors is based on a combination of a retention capability of the sector and an error correction engine of the error correction engines associated with the sector in the association of error correction engines.

20. The method of claim 19, further comprising processing each of the segments in the data stream by:

determining whether the mapping of retention priorities indicates an available sector assigned a matching retention priority matching the retention priority of the segment, wherein the indicated available sector is used to store the segment in response to determining that the mapping of retention priorities indicates the available sector;

selecting an available sector not having the matching retention priority in response to determining that the mapping of retention priorities does not indicate an available sector having the matching retention priority;

determining an error correction engine other than the error correction engine indicted in the association of error correction engines that when used with the selected available sector would result in a retention priority equal or greater than the matching retention priority; and writing the segment to the selected available sector using the determined error correction engine instead of the error correction engine assigned to the sector in the association of error correction engines.

21. The method of claim 20, further comprising:

updating the association of error correction engines to indicate the determined error correction engine for the available sector; and updating the mapping of retention priorities to indicate the matching retention priority for the available sector.

* * * * *